United States Patent
Dain

(10) Patent No.: US 10,007,430 B2
(45) Date of Patent: Jun. 26, 2018

(54) PRE-BUILT DEDUPLICATION REPOSITORY BUILDING BLOCKS

(71) Applicant: INTERNATIONAL BUSINESS MACHINES CORPORATION, Armonk, NY (US)

(72) Inventor: Joseph Whitney Dain, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 14/873,499

(22) Filed: Oct. 2, 2015

(65) Prior Publication Data

US 2017/0097772 A1    Apr. 6, 2017

(51) Int. Cl.
*G06F 12/00*    (2006.01)
*G06F 3/06*    (2006.01)

(52) U.S. Cl.
CPC .......... *G06F 3/0604* (2013.01); *G06F 3/0632* (2013.01); *G06F 3/0641* (2013.01); *G06F 3/0674* (2013.01); *G06F 3/0689* (2013.01)

(58) Field of Classification Search
CPC ..... G06F 3/0604; G06F 3/0632; G06F 3/0673
See application file for complete search history.

(56) References Cited

U.S. PATENT DOCUMENTS

| 8,407,193 | B2 | 3/2013 | Gruhl et al. |
| 8,713,282 | B1 | 4/2014 | Rajimwale et al. |
| 8,918,605 | B2 | 12/2014 | Aronovich et al. |
| 8,930,648 | B1 | 1/2015 | Storer et al. |
| 9,015,131 | B2 | 4/2015 | Kirihata et al. |
| 9,646,016 | B2 | 5/2017 | Ovadya |
| 2014/0115277 | A1 | 4/2014 | Sakata et al. |
| 2015/0032928 | A1 | 1/2015 | Andrews et al. |
| 2015/0293699 | A1 | 10/2015 | Bromley et al. |

OTHER PUBLICATIONS

Orlando et al., IBM System Storage TS7600 with ProtecTIER Version 3.3, Feb. 2014.*
IBM, IBM TS7620 ProtecTIER Deduplication Appliance Express, Feb. 2013.*
IBM, "System, Method, and Service for Automated Capacity Expansion of a Data Deduplication Repository", Jun. 23, 2009, IPCOM000184411D.

* cited by examiner

*Primary Examiner* — Ryan Bertram
*Assistant Examiner* — Trang Ta
(74) *Attorney, Agent, or Firm* — Griffiths & Seaton PLLC

(57) ABSTRACT

Various embodiments for repository management in a data deduplication system, by a processor device, are provided. An expansion appliance is configured at a time of manufacture using a standby device, where the standby device has a same configuration of an existing deduplication device at a destination of the expansion appliance.

22 Claims, 4 Drawing Sheets

PRE-BUILT DEDUPLICATION REPOSITORY BUILDING BLOCKS

BACKGROUND OF THE INVENTION

Field of the Invention

The present invention relates in general computing systems, and more particularly to, various embodiments for repository management in data deduplication systems in computing storage environments.

Description of the Related Art

Today with modern technology, large volumes of data are storable on disk drives; these drives can exist as a solo entity, or as part of a broader make up within a larger storage environment. Often times when writing to even the smallest environment, single drives, duplicate data is written. These duplicated contents can then be DE-duplicated using standard deduplication techniques so long as specific metrics are met.

SUMMARY OF THE INVENTION

Various embodiments for repository management in a data deduplication system, by a processor device, are provided. In one embodiment, by way of example, an expansion appliance is configured at a time of manufacture using a standby device; wherein the standby device has a same configuration of an existing deduplication device at a destination of the expansion appliance.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
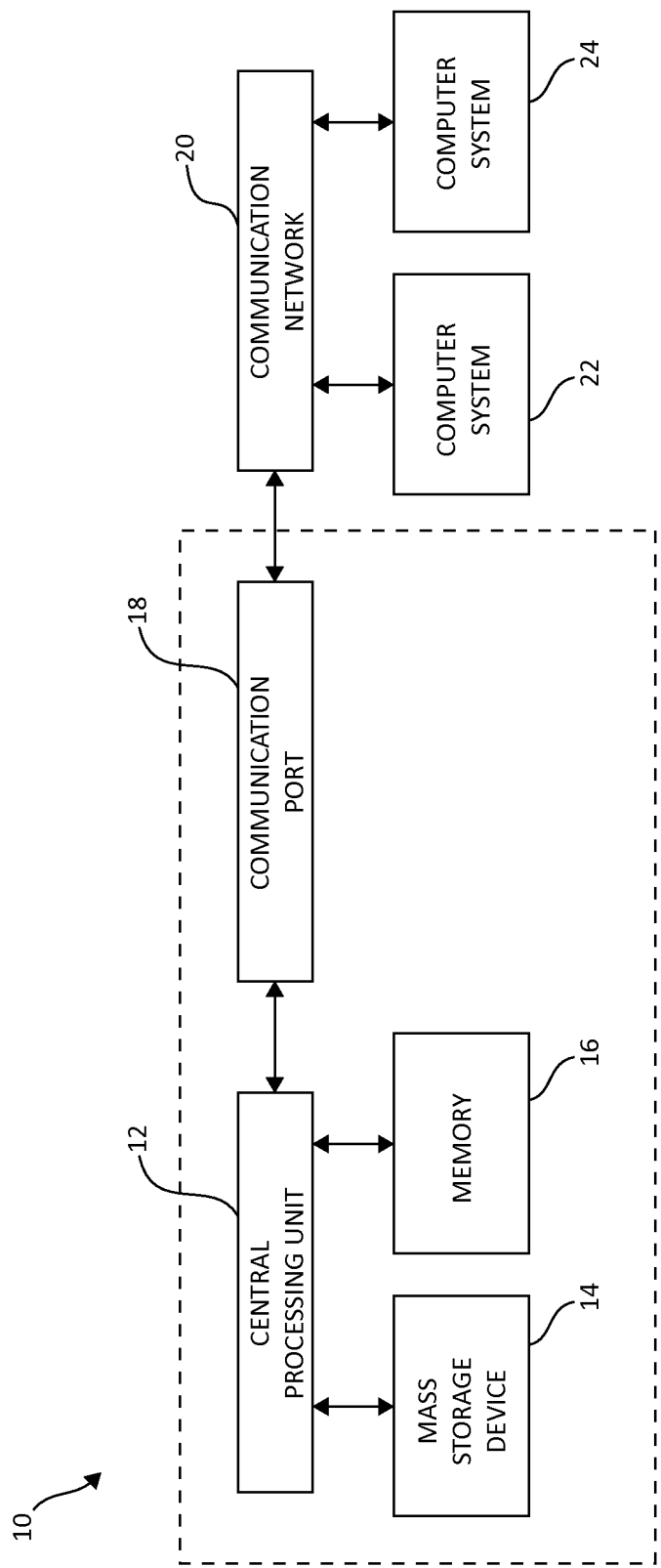
FIG. 1 is a block diagram showing a hardware structure for performing repository management in data deduplication systems, in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

With the continued advancement of computer processors and memory, data storage space has begun to lag behind. While storage space has indeed increased, the demands on the existing space have increased dramatically as well. This increase in demands has resulted in new avenues being explored to better utilize the given storage at hand. Data deduplication is one of those avenues. Modern data deduplication users can achieve 10, sometimes up to 20, (or even greater) times the original storage capacity. In other words, the same user, with the benefit of deduplication technology, essentially has the capacity of ten storage units where the user originally had one, without any additional space or power requirements.

Data deduplication devices such as the IBM® TS7620™, are pre-built deduplication appliances with back-end storage and deduplication repositories fully configured in manufacturing. The TS7620™ is generally built to order according to a host application interface (Virtual Tape Library (VTL), Symantec® OpenStorage Technology™ (OST), or file system interface—Common Internet File Storage (CIFS), or Network File System (NFS)). The TS7620™, among other deduplication appliances, provide a base configuration, with storage repository capacity expandable via connected expansion appliances. Expansion of the repository via the expansion appliances may be performed at a customer site where the base deduplication is located.

When adding additional expansion appliances to an existing base appliance, configuring the deduplication repository is a lengthy process as many steps need to be competed. For example, the expansion drawers of the TS7620™ contain 2TB NL-SAS drives which must be configured to be protected in a Redundant Array of Independent Disks (RAID) configuration. As part of the RAID configuration process, the enclosed arrays must be fully initialized in order to validate all sectors of all of the drives. This is a very time consuming task which may take many hours. The system must then create Linux Logical Volume Manager (LVM) definitions (physical volume, volume group, logical volume), and create file systems. After creation of the file systems, these file systems must be incorporated into the existing repository at which point the capacity of the file system is "padded" (made to be look 100% full) in order to optimize runtime performance. These steps take an additional considerable amount of time.

Therefore, using known methods, to achieve a deduplication repository capacity upgrade at a time other than an original manufacture of the appliance, a lengthy downtime is needed to perform the steps highlighted above. This is very undesirable as these systems are critical to enterprise performance and data retention. Furthermore, if the RAID initialization fails during configuration of the expansion appliance, further downtime may be required to replace hardware and troubleshoot.

Accordingly, the mechanisms of the illustrated embodiments provide a standby device or "dummy" repository manufacturing stand in the original manufacturing fulfillment facility where the aforementioned steps may be performed on the manufacturing stand and exported to the expansion appliance. In other words, the standby device acts as a "proxy" for the existing base deduplication appliance in which the expansion appliance will ultimately be connected to. After shipment to a final destination of the expansion appliance, the then pre-configured appliance may be imported into the existing deduplication repository. Significant advantages are such that extended time required to build and configure the expansion appliance is contained in manufacturing, thus providing a very quick procedure to install the expansion appliance at its final destination. Additionally, the expansion appliance and associated hardware (e.g. drives) may be fully validated in manufacturing prior to shipment.

Turning first to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
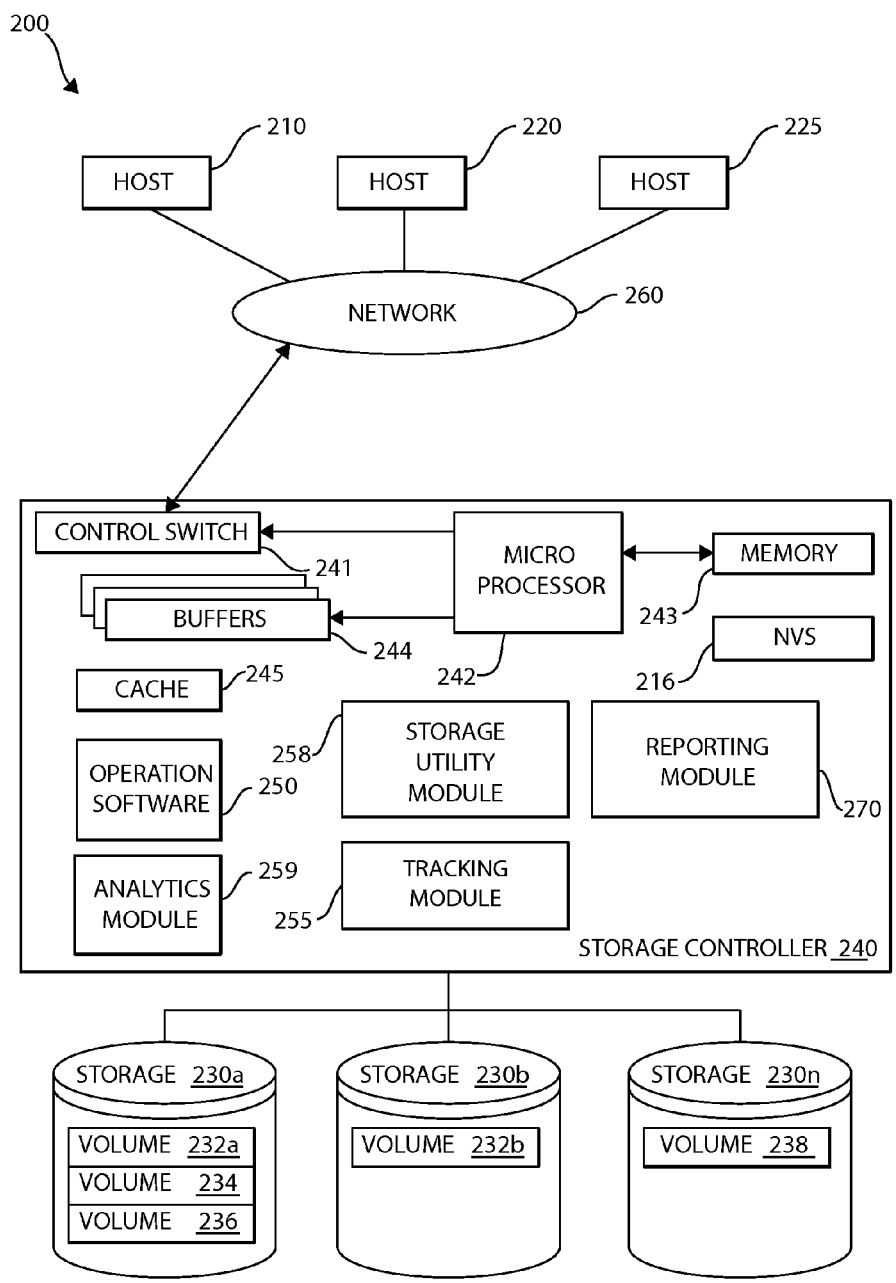
FIG. 2 is a block diagram showing a hardware structure of a data storage system in a computing storage environment, again in which aspects of the present invention may be realized.

FIG. 2 is an exemplary block diagram 200 showing a hardware structure of a data storage and deduplication system that may be used in the overall context of repository management in data deduplication systems. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™, although one of ordinary skill in the art will recognize that a variety of deduplication hardware and software, separately or in combination, may be utilized to implement the data deduplication functionality according to aspects of the illustrated embodiments.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a tracking module 255, a storage utilization module 258, and a reporting module 270. The tracking module 255, storage utilization module 258 and reporting module 270 may operate in conjunction with each and every component of the storage controller 240, the hosts 210, 220, 225, and storage devices 230. The tracking module 255, storage utilization module 258 and reporting module 270 may be structurally one complete module or may be associated and/or included with other individual modules. The tracking module 255, storage utilization module 258 and reporting module 270 may also be located in the cache 245 or other components.

The tracking module 255, storage utilization module 258 and reporting module 270 may individually and/or collectively perform various aspects of the present invention as will be further described. For example, the tracking module 255 may perform tracking operations and related analytics in accordance with aspects of the illustrated embodiments. The storage utilization module 258 may also utilize analytics to determine physical or virtual storage capacities in view of deduplication functionality operational on particular storage devices. Finally, reporting module 270 may notify various portions of the data storage and deduplication system 200 about such various aspects as current capacity utilization, and so forth. As one of ordinary skill in the art will appreciate, the tracking module 255, storage utilization module 258, and reporting module 270 may make up only a subset of various functional and/or functionally responsible entities in the data storage and deduplication system 200.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the tracking module 255, and the analytics module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
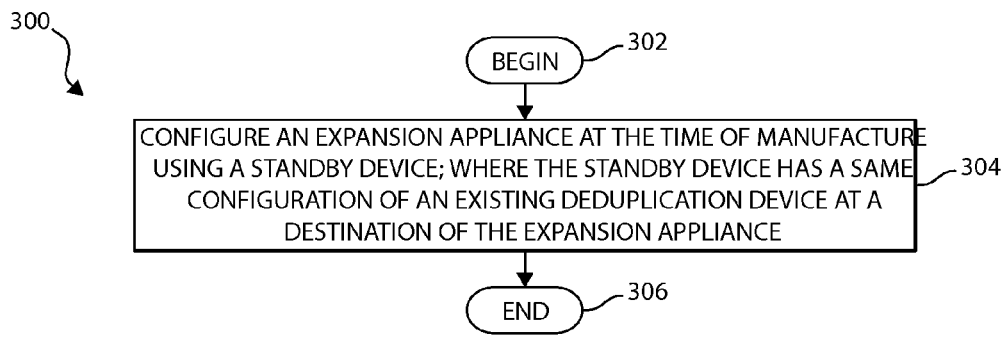
FIG. 3 is a flow chart diagram illustrating a method for repository management in data deduplication systems in accordance with various aspects of the present invention.

Turning now to FIG. 3, a flow chart diagram, illustrating an exemplary method 300 for repository management in data deduplication systems, among other aspects of the illustrated embodiments, is depicted. Method 300 begins (step 302). An expansion appliance is configured at a time of manufacture using a standby device; wherein the standby device has a same configuration of an existing deduplication device at a destination of the expansion appliance (step 304). The method then ends (step 306).

Figure 4:
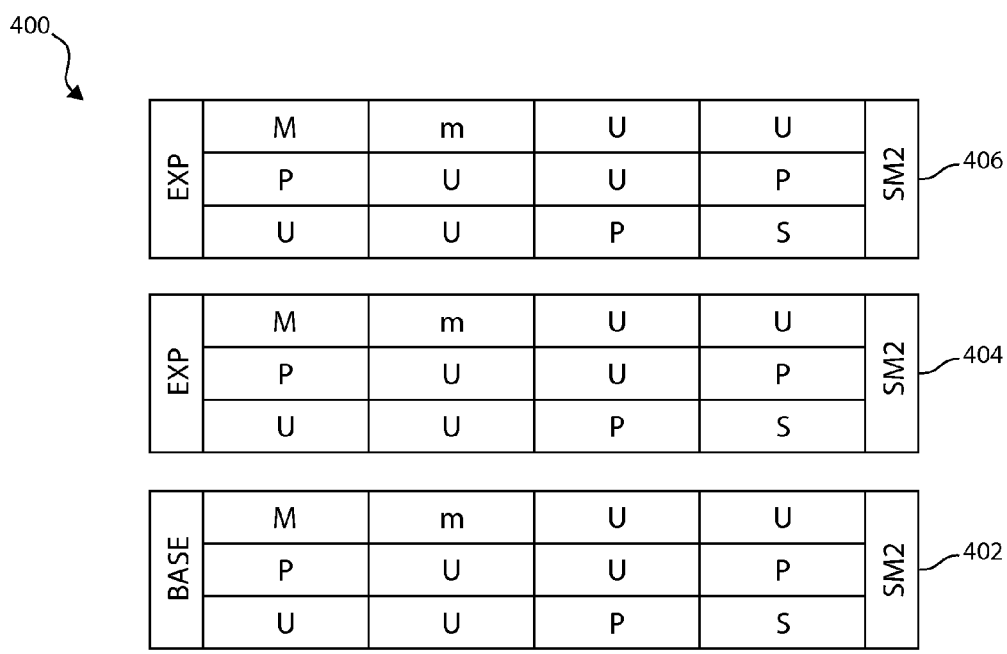
FIG. 4 is a table diagram of configuration information for repository management in data deduplication systems in accordance with various aspects of the present invention.
Figure 5:
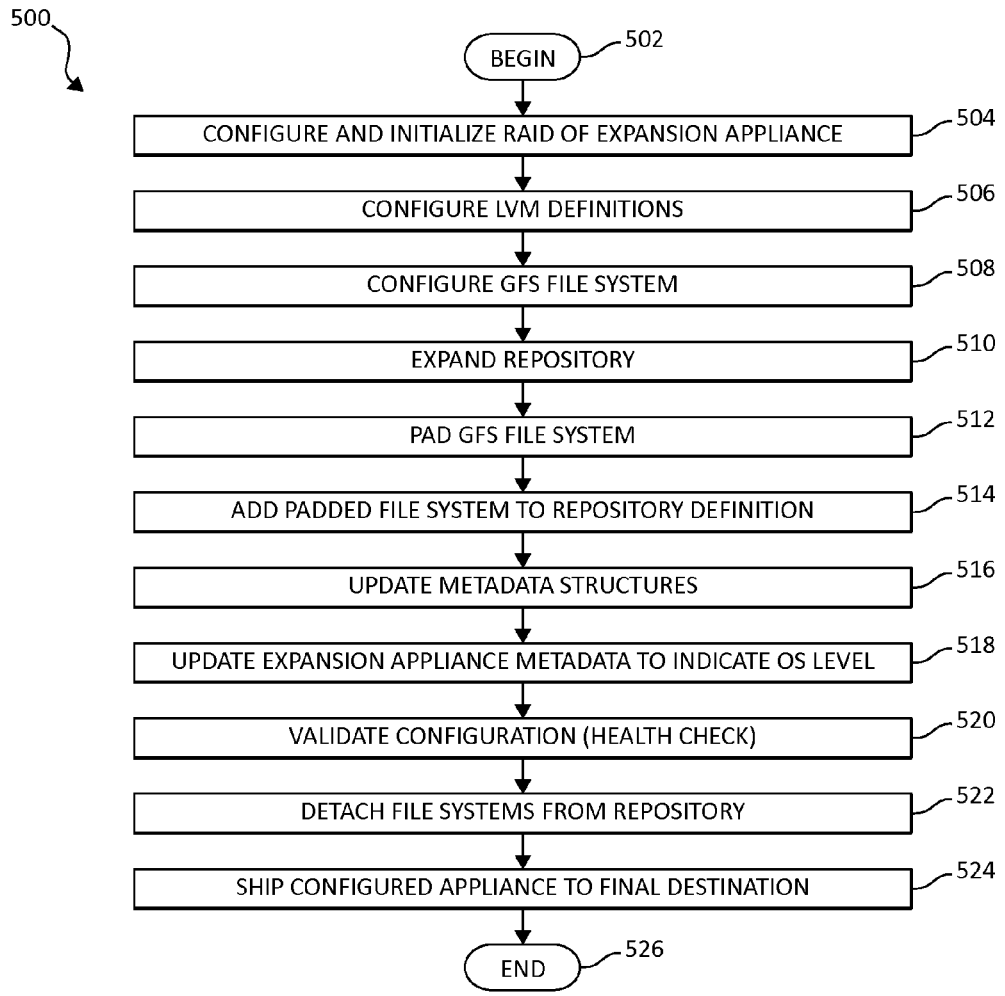
FIG. 5 is an additional flow chart diagram illustrating a method for repository management in data deduplication systems in accordance with various aspects of the present invention.

FIG. 4 illustrates a table diagram 400 of a typical RAID configuration used in TS7620™ base and expansion appliances. Illustrated is a RAID configuration for a TS7620™ base appliance 402, in conjunction with the RAID configuration for TS7620™ expansion appliances 404 and 406. The RAID is configured as:
 M=Metadata (primary)
 m=Metadata (mirror)—shown in grey
 U=User data (primary RAID 5 data)
 P=Parity
 S=Spare FIG. 5 illustrates a flow chart diagram, illustrating an exemplary method 500 for repository management in data deduplication systems, according to aspects of the present invention. In one embodiment, while manufacturing a deduplication base unit, a standby device or "dummy stand" may be provided each type of host interface according to the deduplication base unit (VTL, OST, FSI). When an order is received for an expansion appliance, such as a TS7620™ capacity expansion drawer, a non-configured TS7620™ expansion appliance is attached to the appropriate TS7620™ standby device according to the host interface being used at the destination of the ordered expansion appliance. Returning to method 500, the standby device is then used to initiate a capacity expansion procedure as will be outlined. Beginning (step 502), a data protection scheme, such as a RAID initialization and configuration is performed on the expansion appliance (step 504). LVM definitions are configured (physical volume, volume group, logical volume) (step 506). The Global File System (GFS) is then configured (step 508), and the repository is expanded (step 510). The GFS file system is then padded (step 512), and the padded file system is added to the repository definition (step 514). ProtecTIER™ metadata structures are updated (step 516). The expansion appliance metadata is then updated to indicate the Operating System (OS) level and ProtecTier™ code level that the system was built and configured with (step 518). A validation configuration is performed including a health check of the system (step 520). The file systems are then detached (as well as underlying ProtecTIER™ storage units) from the repository (step 522). The configured expansion appliance is then ready for shipment to its final destination (step 524). The method ends (step 526).

Upon delivery of the expansion appliance to its destination, the steps left to be performed are as follows: (a) A cross check verification that the OS level, ProtecTIER™ code level, and expansion firmware level supplied with the expansion appliance are compatible with the existing deduplication system equipment; (b) RAID configurations associated with the expansion appliance are imported into existing deduplication system; (c) Pre-configured padded file systems and ProtecTIER™ repository storage unit definitions are imported into the existing repository; (d) Mount points are created, and new devices are mounted using the mount points; and (e) ProtecTIER™ metadata is updated to recognize the new repository capacity.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for repository management in a data deduplication system, by a processor device, comprising:
   configuring a repository of an expansion appliance at a time of manufacture using a standby device; wherein the standby device has a same configuration of an existing deduplication device at a destination of the expansion appliance, the standby device thereby acting in proxy of the existing deduplication device to configure the expansion appliance at the time of manufacture.

2. The method of claim 1, further including configuring the expansion appliance by the standby device such that it will be recognized by the existing deduplication device at the destination of the expansion appliance when connected to.

3. The method of claim 2, further including performing a configuration procedure on the standby device and exporting configuration settings to the expansion appliance at the time of manufacture.

4. The method of claim 1, further including configuring the expansion appliance by performing at least one of: configuring and initializing a data protection scheme, configuring device volume definitions, configuring and padding device file system, and updating device metadata structures.

5. The method of claim 1, further including configuring the expansion appliance by including metadata within the expansion appliance to reflect an operating system (OS), firmware version, and software version the expansion appliance has been configured with.

6. The method of claim 5, wherein the expansion appliance is configured to cross check the metadata of the expansion appliance against an operating system (OS), firmware version, and software version of the existing deduplication device at the destination of the expansion appliance to ensure compatibility.

7. The method of claim 1, wherein the expansion appliance is configured to expand repository capacity of the existing deduplication device at the destination of the expansion appliance and import existing repository metadata.

8. A system for repository management in a data deduplication system, the system comprising:
   an expansion appliance;
   a standby device; and
   at least one processor device, wherein the processor device:
      configures a repository of the expansion appliance at a time of manufacture using the standby device; the standby device having a same configuration of an existing deduplication device at a destination of the expansion appliance such that the standby device thereby acts in proxy of the existing deduplication device to configure the expansion appliance at the time of manufacture.

9. The system of claim 8, wherein the at least one processor device configures the expansion appliance by the standby device such that it will be recognized by the existing deduplication device at the destination of the expansion appliance when connected to.

10. The system of claim 9, wherein the at least one processor device performs a configuration procedure on the standby device and exports configuration settings to the expansion appliance at the time of manufacture.

11. The system of claim 8, wherein the at least one processor device configures the expansion appliance by performing at least one of: configuring and initializing a data protection scheme, configuring device volume definitions, configuring and padding device file system, and updating device metadata structures.

12. The system of claim 8, wherein the at least one processor device configures the expansion appliance by including metadata within the expansion appliance to reflect an operating system (OS), firmware version, and software version the expansion appliance has been configured with.

13. The system of claim 12, wherein the expansion appliance is configured to cross check the metadata of the expansion appliance against an operating system (OS), firmware version, and software version of the existing deduplication device at the destination of the expansion appliance to ensure compatibility.

14. The system of claim 8, wherein the expansion device is configured to expand repository capacity of the existing deduplication device at the destination of the expansion appliance and import existing repository metadata.

15. A computer program product for repository management in a data deduplication system, by a processor device, the computer program product embodied on a non-transitory computer-readable storage medium having computer-readable program code portions stored therein, the computer-readable program code portions comprising:
   a first executable portion that configures a repository of an expansion appliance at a time of manufacture using a standby device; wherein the standby device has a same configuration of an existing deduplication device at a destination of the expansion appliance, the standby device thereby acting in proxy of the existing deduplication device to configure the expansion appliance at the time of manufacture.

16. The computer program product of claim 15, further including a second executable portion that configures the expansion appliance by the standby device such that it will be recognized by the existing deduplication device at the destination of the expansion appliance when connected to.

17. The computer program product of claim 16, further including a third executable portion that performs a configuration procedure on the standby device and exports configuration settings to the expansion appliance at the time of manufacture.

18. The computer program product of claim 15, further including a second executable portion that configures the expansion appliance by performing at least one of: configuring and initializing a data protection scheme, configuring device volume definitions, configuring and padding device file system, and updating device metadata structures.

19. The computer program product of claim 15, further including a second executable portion that configures the expansion appliance by including metadata within the expansion appliance to reflect an operating system (OS), firmware version, and software version the expansion appliance has been configured with.

20. The computer program product of claim 18, wherein the expansion appliance is configured to cross check the metadata of the expansion appliance against an operating system (OS), firmware version, and software version of the existing deduplication device at the destination of the expansion appliance to ensure compatibility.

21. The computer program product of claim 15, wherein the expansion device is configured to expand repository capacity of the existing deduplication device at the destination of the expansion appliance and import existing repository metadata.

22. An apparatus for repository management in a data deduplication system by a processor device, the apparatus comprising:

a standby device, wherein the standby device:

configures a repository of a deduplication expansion appliance at a time of manufacture; the standby device having a same configuration of an existing deduplication device at a destination of the expansion appliance such that the standby device thereby acts in proxy of the existing deduplication device to configure the expansion appliance at the time of manufacture.

* * * * *